United States Patent
Gao et al.

(10) Patent No.: US 11,904,303 B2
(45) Date of Patent: Feb. 20, 2024

(54) METHOD OF MAKING AFX ZEOLITES HAVING HIGH THERMAL STABILITY

(71) Applicant: Pacific Industrial Development Corporation, Ann Arbor, MI (US)

(72) Inventors: De Gao, Troy, MI (US); Yunkui Li, Ann Arbor, MI (US); David Shepard, Canton, MI (US); Jeffery Lachapelle, Northville, MI (US); Wei Wu, Ann Arbor, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 138 days.

(21) Appl. No.: 17/292,753

(22) PCT Filed: Nov. 8, 2019

(86) PCT No.: PCT/US2019/060379
§ 371 (c)(1),
(2) Date: May 11, 2021

(87) PCT Pub. No.: WO2020/102009
PCT Pub. Date: May 22, 2020

(65) Prior Publication Data
US 2021/0394165 A1    Dec. 23, 2021

Related U.S. Application Data

(60) Provisional application No. 62/758,810, filed on Nov. 12, 2018.

(51) Int. Cl.
| | | |
|---|---|---|
| *F01N 3/28* | (2006.01) | |
| *B01J 29/76* | (2006.01) | |
| *B01D 53/94* | (2006.01) | |
| *B01J 37/02* | (2006.01) | |
| *B01J 37/30* | (2006.01) | |
| *C01B 39/48* | (2006.01) | |

(52) U.S. Cl.
CPC .......... *B01J 29/76* (2013.01); *B01D 53/9418* (2013.01); *B01J 37/0207* (2013.01); *B01J 37/30* (2013.01); *C01B 39/48* (2013.01); *B01D 2255/20761* (2013.01); *B01D 2255/50* (2013.01); *B01J 2229/18* (2013.01); *C01P 2002/72* (2013.01); *C01P 2004/03* (2013.01); *C01P 2004/32* (2013.01); *C01P 2004/38* (2013.01); *F01N 3/2803* (2013.01); *F01N 2370/04* (2013.01)

(58) Field of Classification Search
None
See application file for complete search history.

(56) References Cited

U.S. PATENT DOCUMENTS

| | | |
|---|---|---|
| 10,053,368 B1 | 8/2018 | Xie et al. |
| 2018/0099876 A1* | 4/2018 | Xie ................ C01B 39/48 |

FOREIGN PATENT DOCUMENTS

| | | |
|---|---|---|
| CN | 107106978 A | 8/2017 |
| CN | 107107043 A | 8/2017 |
| CN | 107207270 A | 9/2017 |
| JP | 2016204245 A | 12/2016 |
| JP | 2018154528 | * 10/2018 |
| WO | 2016057456 A1 | 4/2016 |

OTHER PUBLICATIONS

European Patent Office, Rijswijk, Netherlands, International Search Report of International Application No. PCT/US2019/060379, dated Feb. 21, 2020, 3 pages.
Boruntea, Christian R. et al., "Crystallization of AEI and AFX Zeolites Through Zeolite-to-Zeolite Transformations," Microporous and Mesoporous Materials, vol. 278, Jan. 10, 2018, pp. 105-114, XP055664084, Amsterdam, NL, ISSN: 1387-1811, DOI: 10.1016/j.micromeso.2018.11.002.
Martin, Nuria et al., "Cage-Based Small-Pore Catalysts for NH3-SCR Prepared by Combining Bulky Organic Structure Directing Agents With Modified Zeolites as Reagents," Applied Catalysis B: Environmental, Elsevier, Amsterdam, NL, vol. 217, May 29, 2017, pp. 125-136, XP085112832, ISSN: 0926-3373, DOI: 10.1016/J.APCATB.2017.05.082.
Lee, Song-Ho et al., "Zeolite Synthesis in the Presence of Flexible Diquaternary AlkylammoniumIons (C2H5)3N+(CH2)nN+(C2H5)3 With n=3-10 as Structure-Directing Agents," Microporous and Mesoporous Materials, vol. 60, No. 1-3, Jun. 1, 2003, pp. 237-249, XP055091771, ISSN: 1387-1811, DOI: 10.1016/S1387-1811(03)00381-0.

* cited by examiner

*Primary Examiner* — Sheng H Davis
(74) *Attorney, Agent, or Firm* — Dickinson Wright PLLC (57) ABSTRACT

A method of forming an AFX zeolite in a hydrothermal synthesis that exhibits a silica to alumina ($SiO_2Al_2O_3$) molar ratio (SAR) that is between 8:1 and 26:1; has a morphology that includes one or more of cubic, spheroidal, or rhombic particles with a crystal size that is in the range of about 0.1 micrometer ($\mu m$) to 10 $\mu m$. This AFX zeolite also exhibits a Brönsted acidity that is in the range of 1.2 mmol/g to 3.6 mmol/g as measured by ammonia temperature programmed desorption. A catalyst formed by substituting a metal into the framework of the zeolite exhibits about a 100% conversion of NO emissions over the temperature range of 300° C. to 650° C.

16 Claims, 6 Drawing Sheets

METHOD OF MAKING AFX ZEOLITES HAVING HIGH THERMAL STABILITY

CROSS REFERENCE TO RELATED APPLICATIONS

This application is a national stage filing of International Application No. PCT/US2019/060379 filed on Nov. 8, 2019, designating the United States and published in English, which claims the benefit of the filing date under 35 U.S.C. § 119(e) of U.S. Provisional Application No. 62/758,810 filed on Nov. 12, 2018, the entire contents of which are both incorporated herein by reference in their entirety.

This disclosure relates generally to a method of making an AFX zeolite that exhibits high thermal stability, the AFX zeolite formed according to this method, catalysts formed from the AFX zeolites, and the use of such catalysts in $NO_x$ conversion reactions.

The statements in this section merely provide background information related to the present disclosure and may not constitute prior art. Microporous zeolites, which contain three-dimensional channels, play an important role in the selective catalytic reduction (SCR) of $NO_x$ exhaust emissions that arise from diesel engines. More specifically, these zeolites are incorporated as part of an SCR catalyst that is capable of converting $NO_x$ gases in the presence of a reducing agent (e.g., ammonia) to elemental nitrogen ($N_2$) and water ($H_2O$). These $NO_x$ gases may include one or more of NO, $NO_2$, and $N_2O$ in addition to other non-$NO_x$ gases such as $N_2$, $O_2$, CO, $CO_2$, $SO_2$, HCl and $H_2O$. In such SCR processes, the reducing agent is generally added to the exhaust gases prior to the gases contacting the SCR catalyst. The reducing agent absorbs onto the SCR catalyst and the $NO_x$ reduction reaction takes place as the gases pass through or over the catalyst.

Zeolites are aluminosilicate materials that exhibit a crystalline framework of silica ($SiO_2$) and alumina ($Al_2O_3$) interconnected via the sharing of oxygen atoms. Thus, zeolites may be characterized by the ratio of $SiO_2:Al_2O_3$ (SAR) present in the crystalline framework. A higher SAR value generally correlates with the SCR catalyst exhibiting higher hydrothermal stability. Since an exhaust gas may contain water vapor and exhibit a temperature of at least 500° C. as it exits the engine, the hydrothermal stability of the SCR catalyst becomes an important consideration when designing the catalyst.

SUMMARY

This disclosure relates generally to a method of making an AFX zeolite that has high thermal stability, the AFX zeolites formed according to this method, catalysts formed from the AFX zeolites, and the use of such catalysts in $NO_x$ conversion reactions.

According to one aspect of the present disclosure, the method of making an AFX zeolite comprises the steps of: a) providing a source of silica; b) providing a source of alumina; c) providing a structure directional agent (SDA); d) optionally, providing a source of a base; e) providing a source of metal cations; f) mixing the source of silica, alumina, SDA, and metal cations in water to form a gel composition; g) heating the gel composition to a crystallization temperature that less than 225° C.; h) maintaining the gel composition at the crystallization temperature for a time period that ranges from 24 hours to 48 hours; i) allowing the AFX zeolite to crystallize and precipitate; the gel composition forming a crystalline precipitate of the AFX zeolite and a mother liquid; and j) separating the crystalline precipitate from the mother liquid. The source of silica and the source of alumina may be provided by an aluminosilicate, such as a Y zeolite, having a silica to alumina ($SiO_2:Al_2O_3$) molar ratio (SAR) that is between 10:1 and 30:1.

The AFX zeolite so formed exhibits a silica to alumina ($SiO_2:Al_2O_3$) molar ratio that is in the range of 8:1 to 26:1. Alternatively, the silica to alumina ratio, which is also known as SAR, is in the range of 8:1 to about 13:1. This method is a hydrothermal synthesis that yields an AFX zeolite with a morphology that includes one or more of cubic, spheroidal, or rhombic particles; and a crystal size that is in the range of about 0.1 micrometer (μm) to 10 μm. The AFX zeolite also exhibits a Brönsted acidity that is in the range of 1.2 mmol/g to 3.6 mmol/g as measured by ammonia temperature programmed desorption.

The AFX zeolite may be used as a support material for a catalyst for use in NOx conversion reactions. This catalyst may be prepared using a method that comprises: forming an AFX zeolite, such that it contains one or more metal cations as part of the AFX zeolite; providing a source of at least one transition metal; and subjecting the AFX zeolite and the source of the transition metal to an ion exchange, impregnation, or isomorphous substitution process. In this process, the at least one transition metal is substituted for the metal cations in the AFX zeolite, thereby forming the catalyst. The amount of the transition metal (TM) and aluminum present in the catalyst is further defined by a TM:Al molar ratio in the range of 0.3 to 1.

This transition metal containing AFX catalyst during use exhibits about 100% conversion of NO emissions over the temperature range of about 300° C. to 650° C. and about 5% to about 10% conversion of $N_2O$ emissions over the same temperature range. The catalyst after being aged at 700° C. may also exhibit about 100% conversion of the NO emissions and about 10% conversion of $N_2O$ over the temperature range of 350° C. to about 550° C. In addition, the catalyst exhibits a selectivity to $N_2O$ formation at temperatures less than 400° C. that is at least 30% less than a conventional SSZ-13 zeolite catalyst having the same transition metal loading.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the zeolite support made and used according to the teachings contained herein is described throughout the present disclosure in conjunction with a selective catalytic reduction (SCR) catalyst in order to more fully illustrate the composition and the use thereof. The incorporation and use of such an AFX zeolite in other applications, such as adsorbents, ion exchange agents, or as a support material used for other industrial catalysts and/or environmental catalysts is contemplated to be within the scope of the present disclosure. It should be understood that throughout the description, corresponding reference numerals indicate like or corresponding parts and features.

The present disclosure provides a synthetic method for forming an aluminosilicate AFX zeolite capable of being used as a catalyst support in $NO_x$ conversion reactions. The AFX zeolite formed according to the teachings of the present disclosure has a $SiO_2$:$Al_2O_3$ molar ratio (SAR) that is in the range of 8:1 to 26:1, while exhibiting a high level of acidity. Alternatively, the SAR of the AFX zeolite is in the range of 8:1 to about 13:1.

According to one aspect of the present disclosure, this method limits the use of the structure directional agent (SDA), such that the SDA to $SiO_2$ molar ratio is between about 0.05:1 to about 0.30:1. The low amount of SDA utilized in this method along with the high yield of the AFX zeolite formed according to this method results in an inexpensive method that does not require additional steps, such as the reuse of the mother liquid in order to reduce cost.

The AFX zeolite formed according to the method described above and further defined herein is economically feasible for use in most applications. The prior use of conventional synthetic methods of forming an AFX zeolite limited the use of such zeolites in cost sensitive applications, such as a support material for a catalyst in a selective reduction reaction (SCR) of $NO_x$ contained in the exhaust gas of a vehicle.

According to one aspect of the present disclosure, the AFX zeolite formed according the method exhibits a $SiO_2$/$Al_2O_3$ molar ratio of less than or equal to 26, an average particle size from 0.1 micrometer (μm) to about 10.0 μm, a morphology that includes one or more of cubic, spheroidal, or rhombic particles, and a high level of acidity. The AFX zeolite so formed has excellent durability and heat resistance, and metal-containing catalyst formed therefrom exhibit an enhanced NOx reduction rate as compared to metal-containing catalysts formed with conventional Chabazite-type zeolites.

In general, zeolites are crystalline or quasi-crystalline aluminosilicates comprised of repeating $TO_4$ tetrahedral units with T being most commonly silicon (Si) or aluminum (Al). These repeating units are linked together to form a crystalline framework or structure that includes cavities and/or channels of molecular dimensions within the crystalline structure. Thus, aluminosilicate zeolites comprise at least oxygen (O), aluminum (Al), and silicon (Si) as atoms incorporated in the framework structure thereof.

The notation, "AFX" represents a code specified by the International Zeolite Associate (IZA) that defines the framework structure of the zeolite. Thus, an AFX zeolite means an aluminosilicate in which the primary crystalline phase of the zeolite is "AFX". In the AFX zeolite of the present disclosure, the presence of another crystalline phase or framework structure, such as "FAU", in the zeolite is absent or nonexistent. In other words, the AFX zeolite of the present disclosure is substantially free of other crystalline phases and is not an intergrowth of two or more framework types. Alternatively, the AFX zeolite formed according to the present disclosure comprises at least 90% of the zeolite framework is AFX; at least 95% of the zeolite framework is AFX; alternatively, at least 97% of the zeolite framework is AFX.

In addition, the AFX crystal structure does not have an appreciable amount of phosphorous in its framework. In other words, the AFX zeolite of the present disclosure does not have comprise an amount of phosphorous that would affect the basic physical and/or chemical properties of the material, such as the zeolites capacity to selectively reduce $NO_x$ over a broad temperature range.

The crystalline phase or framework structure of a zeolite may be characterized by X-ray diffraction (XRD) data. However, the XRD measurement may be influenced by a variety of factors, such as the growth direction of the zeolite; the ratio of constituent elements; the presence of an adsorbed substance, defect, or the like; and deviation in the intensity ratio or positioning of each peak in the XRD spectrum. Therefore, a deviation of 10% or less; alternatively, 5% or less; alternatively, 1% or less in the numerical value measured for each parameter of the AFX structure as described in the definition provided by the IZA is within expected tolerance.

According to one aspect of the present disclosure, the AFX zeolites may include natural zeolites, synthetic zeolites, or a mixture thereof. Alternatively, the AFX zeolites are synthetic zeolites formed according to the teachings of the present disclosure. Synthetic zeolites exhibit greater uniformity with respect to SAR, crystallite size, and crystallite morphology, as well has fewer and less concentrated impurities (e.g. alkaline earth metals).

The AFX zeolites comprise crystals with a mean crystal size of about 0.1 micrometers (μm) to about 10.0 micrometers (μm). Alternatively, the crystal size is between about 0.2 μm and about 8 μm; alternatively, at least 0.25 μm and less than 7.5 μm. The crystals in the AFX zeolites may be individual crystals, agglomeration of crystals, or a combination of both, provided the lower limit on the mean particle size associated with such agglomeration is the zeolites' mean individual crystal size.

Crystal size may also be referred to as a crystal diameter because it represents the length of one edge of a face of the crystal. Particle size of an agglomeration of crystals may be defined in a similar manner except that instead of the edge of a face of an individual crystal, the particle size represents the length of the longest side of the agglomeration of crystals. As used herein, the term "mean' with respect to crystal or particle size is intended to represent the arithmetic mean of a statistically significant sample of the zeolites.

The AFX zeolites formed exhibit a mean particle size that is less than 50 micrometers (μm); alternatively, less than about 20 micrometers; alternatively, less than 10 μm. The mean particle size of the AFX zeolites may be measured using any known conventional method including, without limitation, laser diffraction, dynamic light scattering, and sieving.

According to another aspect of the present disclosure, the AFX zeolites have a mole ratio of silica-to-alumina (SAR) that is in the range of 8:1 to about 26:1. Alternatively, the SAR of the AFX zeolites is between about 8:1 to about 13:1; alternatively, between about 8:1 to about 11:1. The mole ratio of silica-to-alumina (SAR) of the zeolites may be determined using any conventional analysis means, such as for example, the x-ray fluorescence (XRF) or inductively coupled plasma (ICP) emission spectroscopy. The SAR ratio represents the ratio of silicon to aluminum atoms present in the crystal framework of the zeolite crystals.

The morphology exhibited by the "dried" AFX zeolites may resemble cubes, square flakes, spherical particles; rhombic particles, irregular particles, or a combination or mixture thereof. Alternatively, the morphology of the AFX zeolites include one or more of cubic, spheroidal, or rhombic particles. Alternatively, the morphology of the AFX zeolites includes rhombic particles.

Figure 1:
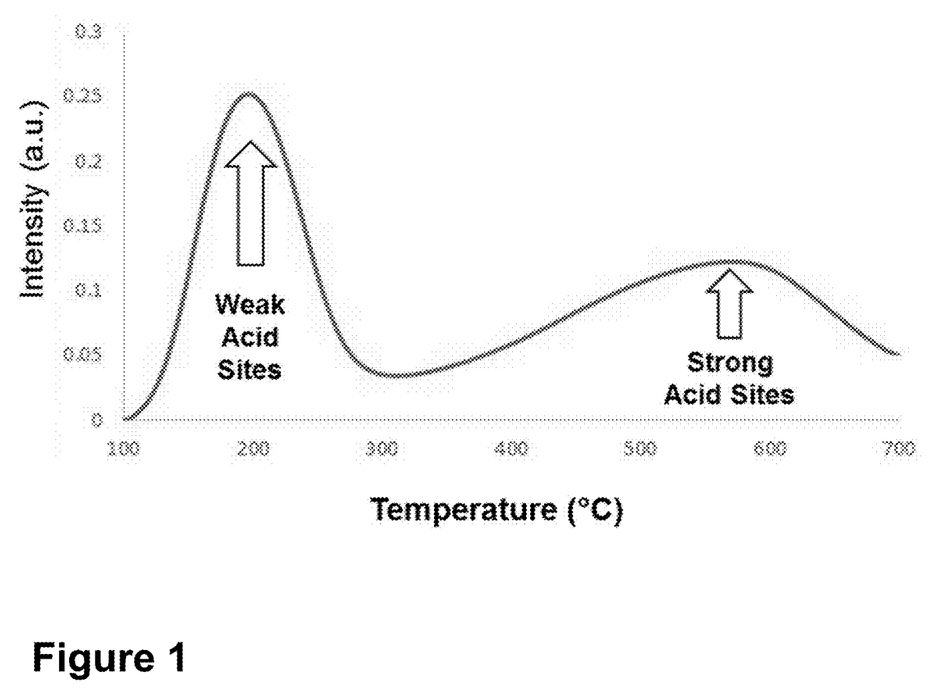
FIG. 1 is a graph obtained from ammonia temperature programmed desorption from which the Brönsted acidity exhibited by the AFX zeolites formed according to the teachings of the present disclosure is determined.

The formed AFX zeolites may also exhibit a high level of acidity. The formed AFX zeolites exhibit a Brönsted acidity that is in the range of 1.2 mmol/g to 3.6 mmol/g as measured by ammonia temperature programmed desorption as shown in FIG. 1. Alternatively, the Brönsted acidity exhibited by the AFX zeolites is in the range of about 1.5 mmol/g to about 3.0 mmol/g; alternatively, the Brönsted acidity exhibited by the AFX zeolites may be between about 2.0 mmol/g and about 2.8 mmol/g. In FIG. 1, AFX zeolite formed according to the teachings of the present disclosure and tested exhibit two $NH_3$ desorption peaks. The $NH_3$ desorption peak that occurs at a temperature that is less than 200° C. is associated with weak acid sites, while the other peak that occurs at a temperature that is higher than 500° C. is associated with strong acid sites. The AFX zeolite shown in FIG. 1 was measured to exhibit a Brönsted acidity of 2.10 mmol/g.

Figure 2:
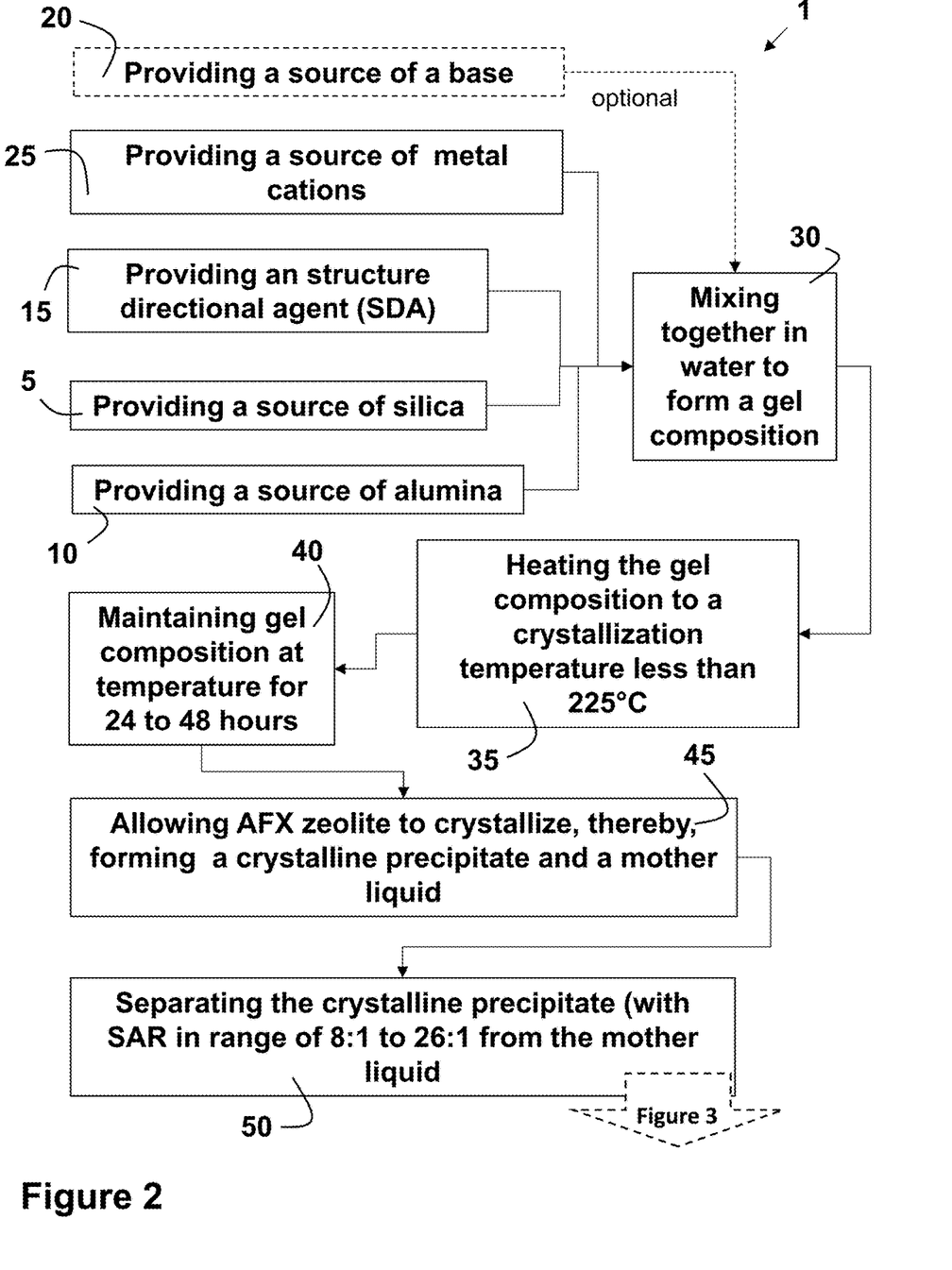
FIG. 2 is a flowchart of a method for preparing an AFX zeolite according to the teachings of the present disclosure.

Referring now to FIG. 2, a hydrothermal synthetic method 1 is provided for producing an AFX zeolite that exhibits a silica to alumina ($SiO_2:Al_2O_3$) molar ratio (SAR) in the range of 8:1 to 26:1, a crystal size that is in the range of about 0.1 micrometers (μm) to 10 μm, and a morphology that includes one or more of cubic, spheroidal, or rhombic particles. This hydrothermal method 1 generally comprises the steps of:

a) providing 5 a source of silica;
b) providing 10 a source of alumina;
c) providing 15 a structure directional agent (SDA);
d) optionally, providing 20 a source of a base ($OH^-$);
e) providing 25 a source of metal cations;
f) mixing 30 the source of silica, alumina, SDA, and metal cations in water to form a gel composition;
g) heating 35 the gel composition to a crystallization temperature that is less than 225° C.;
h) maintaining 40 the gel composition at the crystallization temperature for a time period that ranges from 24 hours to 48 hours;
i) allowing 45 the AFX zeolite to crystallize and precipitate from the gel composition; forming a crystalline precipitate and a mother liquid; and
j) separating 50 the crystalline precipitate from the mother liquid.

The source of silica may comprise, consist essentially of, or consist of sodium silicate, silica sol, colloidal silica, fumed silica, tetraethyl orthosilicate, Y zeolite, or a mixture thereof. The amount of silica present in the gel composition is determined by the amount necessary for each of the other raw materials to be within the ranges specified herein with respect to the silica in order to provide an AFX zeolite that exhibits the desired $SiO_2:Al_2O_3$ molar ratio, crystal size, and morphology. The source of silica should be selected in a form that enables uniform mixing with the other raw materials used to form the gel composition.

The source of aluminum may comprise, consist essentially of, or consist of one or more of aluminum metal, aluminum hydroxide (e.g., gibbsite, boehmite, etc.), aluminum sulfate, aluminum nitrate, sodium aluminate, aluminum chloride, aluminosilicate gel, Y zeolite, or a mixture thereof. The amount of alumina present in in the gel composition is determined by the amount necessary for each of the other raw materials to be within the ranges specified herein with respect to the silica in order to provide an AFX zeolite that exhibits the desired $SiO_2:Al_2O_3$ ratio, crystal size, and morphology. The source of alumina should be selected in a form that enables uniform mixing with the other raw materials used to form the gel composition.

According to one aspect of the present disclosure, combined sources of silicon oxide and aluminum oxide can additionally or alternatively be used. These combined sources include, without limitation colloidal aluminosilicates, aluminosilicate zeolites, and clays or treated clays. An example of an aluminosilicate zeolite is a Y zeolite having a silica to alumina molar ratio (SAR) between 10:1 and about 30:1; alternatively, between 10:1 and 15:1; alternatively, at least 10:1; alternatively, at least 30:1.

The structure directional agents (SDA) that are used in the preparation of AFX zeolites are typically complex molecules capable of guiding or directing the molecular shape and pattern of the zeolite's framework. Generally, the zeolite crystals form around the SDA. After the crystals are formed, the SDA is removed from the interior structure of the crystals, leaving a molecularly porous cage-like structure.

The amount of the structure directing agent (SDA) utilized in forming the AFX zeolites is defined by a molar ratio of the SDA to silica ($SDA:SiO_2$) of about 0.05:1 to about 0.30:1; alternatively, about 0.10:1 to about 0.30:1; alternatively, about 0.15:1 to about 0.30:1; alternatively, about 0.20:1 to about 0.30:1; alternatively, about 0.25:1 to about 0.30:1. The SDA may include, but not be limited to a hydroxide, a halide, a carbonate, a methyl carbonate, or a sulfate for which an N,N,N-trialkyladamantyl ammonium cation, an N,N,N-trimethylbenzyl ammonium cation, N-alkyl-3-quinuclidinol cation, an N,N'-bis-triethylpentanediyldiammonium cation, or N,N,N-trialkylexoaminonorbomane cation is also present. Alternatively, the SDA is N,N-Dimethyl-3,5-dimethylpiperidinium hydroxide, N,N-Diethyl-2,6-dimethylpiperidinium hydroxide, tetraethylphosphonium hydroxide, or a mixture thereof. Alternatively, the SDA comprises an N,N'-bis-triethylpentanediyldiammonium cation.

The amount of the structure directing agent (SDA) used to form the gel composition may also be characterized by the molar ratio of base ($OH^-$) to silica ($OH^-:SiO_2$) present in the gel composition, when the base is derived from the anion disassociated from the SDA when dissolved in the water. The molar ratio $OH^-:SiO_2$ may range from about 0.7:1 to 0.9:1; alternatively, between about 0.75:1 to about 0.85:1; alternatively, about 0.80:1. Optionally, additional base ($OH^-$) may be provided as a raw material used to form the gel composition provided the molar ratio of $OH^-:SiO_2$ remains within the specified range.

In order to improve selectivity for zeolites exhibiting the AFX framework or to shorten the time necessary for crystallization to occur, the gel composition may be seeded with one or more AFX crystals. These AFX crystals are capable of spontaneous nucleation in the gel composition. When desirable, the AFX seed crystals may be added to the gel composition in an amount ranging from 0.01 ppm to about 10,000 ppm by weight of the gel composition; alternatively, from about 1 ppm to about 5,000 ppm by weight of the gel composition.

The amount of water used in forming the gel composition may be defined by a molar ratio of water to silica ($H_2O:SiO_2$) that ranges from about 20:1 to about 80:1. Alternatively, the $H_2O:SiO_2$ molar ratio is between 30:1 to 70:1. Alternatively, the $H_2O:SiO_2$ molar ratio is between 40:1 to 60:1. Alternatively, the $H_2O:SiO_2$ molar ratio is about 50:1.

The source of metal (M) ions may comprise, consist essentially of, or consist of an alkali metal, an alkaline earth metal, or a combination thereof. The alkali metals or alkaline earth metals may be independently selected to be sodium (Na), potassium (K), calcium (Ca), barium (Ba), or strontium (Sr). The alkali or alkaline earth metal cations may be obtained from a metal halide, metal hydroxide, metal carbonate, metal hydrogen carbonate, metal nitrate, or metal sulfate.

The inclusion of alkali metal or alkaline earth metal cations in the gel composition helps to facilitate crystallization by forcing the SDA to coordinate with aluminum in a preferred state. When a zeolite is used as an adsorbent or as a support for a catalyst, any alkali metal or alkaline earth atoms that are incorporated into the crystal structure of the zeolite during the formation of the zeolite may be removed from within the crystal structure by an ion exchange mechanism. An ion exchange mechanism is capable of replacing the alkali metal or alkaline earth cations with hydrogen, ammonium, or any other desired metal ion.

Crystallization of the AFX zeolite from the above reaction mixture can be accomplished under either static, tumbled, or stirred conditions in a suitable reactor vessel. The reaction vessel used for hydrothermal synthesis is not particularly limited provided it is resistant to the application of heat and pressure. An example of such a vessel includes, without limitation, an autoclave. The mixture of raw materials charged into the reaction vessel may be sealed therein prior to heating and being exposed to an elevated pressure.

The gel composition formed in step f) of the method 1 in FIG. 2 may be subjected to hydrothermal conditions just after the preparation, or when desirable after undergoing a period of mixing, e.g., aging at a low temperature including, without limitation about room temperature or less than 100° C. over a period of about 1 to about 24 hours. During production on a large scale, a deterioration in the mixing the raw materials may be undesirable, in that a sufficient state of admixture is necessary to achieve high yield and proper crystallization of the AFX zeolites.

Still referring to FIG. 2, during implementation of the method 1, the gel composition is subjected to heating 35 at predetermined crystallization temperature for a predetermined amount of time. This hydrothermal synthesis utilizes a crystallization temperature that is less than 225° C.; alternatively, between about 120° C. and about 200° C.; alternatively, from about 130° C. to about 165° C. The period of time over which the temperature is maintained 35 in order to result in the crystallization and precipitation of the AFX zeolite is between 24 hours and 48 hours; alternatively between about 20 hours and about 36 hours; alternatively between about 30 hours and about 40 hours.

Upon completion of the hydrothermal reaction, the AFX zeolite in the form of a crystalline precipitate is separated from remaining liquid (e.g., the mother liquid). The mother liquid may be discarded, or when desirable, reused as a replacement for at least a portion of the water that is used in the making of another batch of the AFX zeolite. This separation may use any known conventional method, including but not limited to, filtration, decantation, or direct drying (e.g., evaporation).

After separation from the mother liquid, the AFX zeolite, which may include some SDA and/or metal cations, may be collected, optionally washed with water, and then dried. The dried support material may be used in the dried state for some applications or subjected to calcination prior to use for other applications. As a result of the crystallization process, the recovered crystalline AFX zeolites may contain within its pore structure at least a portion of the structure directing agent (SDA) used in the synthesis. Calcination of the AFX zeolites at a high temperature (e.g., >200 C; >300 C, etc.) removes any residual SDA present in the porous structure.

The yield of AFX zeolites formed according to this method is greater than 25% relative to the total oxide present in the gel composition. Alternatively, the yield is greater than 35%; alternatively, greater than 45%. Thus, the method of the present disclosure does not need to reuse the mother liquid as part of the water used to form the gel composition in order to obtain a high yield. However, since the mother liquid contains unreacted SDA, when desirable, the mother liquid may be used to replace at least a portion of the water in which the raw materials are mixed to form the gel composition.

The "dried" AFX zeolites formed herein may also exhibit a BET specific surface area measured using a conventional Brunauer-Emmett-Teller (BET) method that is about 200 $m^2/g$ to about 700 $m^2/g$; alternatively, about 300 $m^2/g$ to about 600 $m^2/g$; alternatively, about 400 $m^2/g$ to about 500 $m^2/g$; alternatively, about 450 $m^2/g$ to about 500 $m^2/g$; alternatively, about 475 $m^2/g$; alternatively about 480 $m^2/g$.

The use of the AFX zeolite formed according to the method of the present disclosure may include, without limitation, as a support material for a catalyst, an absorbent, or a separation material. The "dried" AFX zeolites may be used prior to or after calcination.

A catalyst may comprise the AFX zeolite with one or more catalytic metal ions exchanged for an atom in the framework or otherwise impregnated into the pores and/or cavities of the zeolite. As used herein, the terms "metal exchanged" and "metal substituted" are used in a similar fashion to mean that one or more of the aluminum or silicon framework atoms have been replaced by a substituting metal.

Several examples of catalytic metal ions that may be incorporated into the AFX zeolite include, without limitation, ions of transition metals, platinum group metals (PGM), precious metals, such as gold or silver; rare earth metals, or mixtures thereof. As used herein transition metals are elements of Groups 3-12, where the electron configuration starts filling electrons in the 3 d-6 d shells, while rare earth metals are elements that start filling electrons in the 4 f or 5 f shells. These d-block elements are generally called "transition metals", while the f-block elements are generally called, lanthanides, actinides, and/or "inner transition metals".

The transition metals may comprise, consist essentially of, or consist of copper, nickel, zinc, iron, tungsten, molybdenum, cobalt, titanium, zirconium, chromium, manganese, or tin. Alternatively, the transition comprises, consists of, or consists essentially of iron (Fe), copper (Cu), or manganese (Mn). Platinum group metals may include, without limitation, ruthenium, rhodium, palladium, indium, and platinum. Rare earth metals include lanthanum, cerium, praseodymium, neodymium, europium, terbium, erbium, ytterbium, and yttrium.

Figure 3:
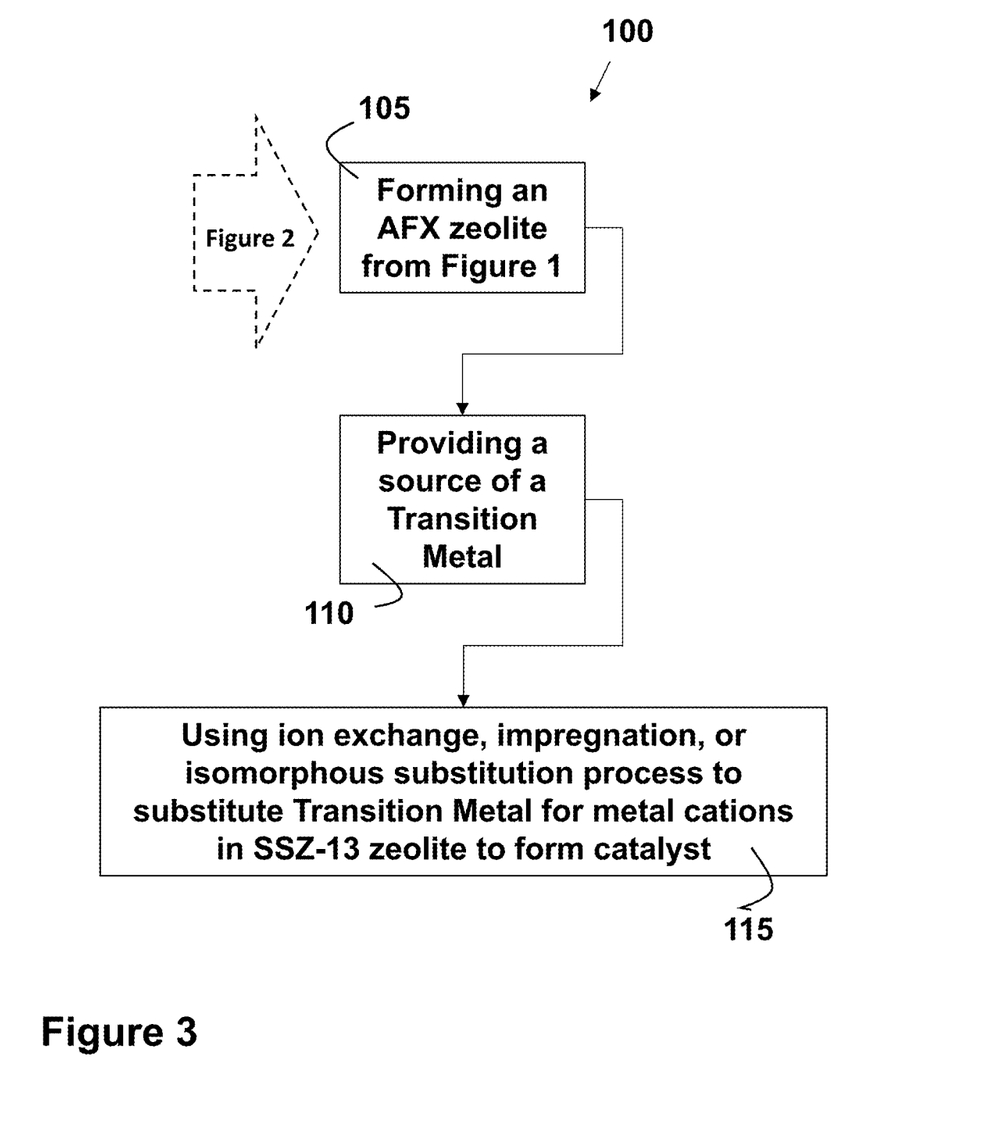
FIG. 3 is a flowchart of a method for preparing a catalyst according to the teachings of the present disclosure using the AFX zeolite formed according to FIG. 2.

According to another aspect of the present disclosure a method of preparing a catalyst using the AFX zeolite as a support is provided. Referring now to FIG. 3, this method 100, generally comprises the steps of: forming 105 an AFX zeolite according to the method previously described above and further defined herein that contains one or more metal cations as part of the AFX zeolite; providing 110 a source of at least one transition metal; and subjecting 115 the AFX zeolite and the source of the transition metal to an ion exchange, impregnation, or isomorphous substitution process, such that at least one transition metal is substituted for the metal cations in the AFX zeolite, thereby forming the catalyst.

The amount of the catalytic metal ions (M) and aluminum present in the catalyst is further defined by a molar ratio of the substituted metal to aluminum (M:Al) that is in the range of 0.3:1 to 1:1. Alternatively, the molar ratio of M:Al is in the range of about 0.4:1 to 0.9:1; alternatively, the molar ratio of M:Al is between about 0.5:1 and 0.8:1. The amount of catalytic metal ions that are incorporated into zeolite is capable of achieving a $NO_x$ conversion of at least about 40%; alternatively, at least about 50%; and alternatively, at least about 60%.

A higher metal loading incorporated into or on the AFX zeolite support generally results in higher NOx conversion. However, the level of metal incorporated therein is often dependent on the quantity of exchange sites that are present in the zeolite, which in turn is dependent upon the zeolite's SAR value. In general, zeolites with low SAR allow for the highest metal loadings, while zeolites with a high SAR exhibit higher hydrothermal stability. Thus, a conflict exists between the need for high catalytic activity and high hydrothermal stability. The catalyst formed according to the teachings of the present disclosure generally exhibits a high catalytic activity while maintaining substantial hydrothermal stability.

The nitrogen oxides which are reduced using a catalyst containing the AFX zeolite of the present disclosure may be obtained by any process (e.g., as a waste gas stream). According to one aspect of the present disclosure, the gaseous stream containing NO is an exhaust gas from an internal combustion engine. The catalyst has been unexpectedly found to exhibit about 100% conversion of NO emissions over the temperature range of about 300° C. to 650° C. and about 5% to about 10% conversion of $N_2O$ emissions over the same temperature range. The catalyst after being aged at 700° C. may also exhibit about 100% conversion of the NO emissions and about 10% conversion of $N_2O$ over the temperature range of 350° C. to about 550° C. In addition, the catalyst exhibits a selectivity to $N_2O$ formation at temperatures less than 400° C. that is at least 30% less than a conventional SSZ-13 zeolite catalyst having the same transition metal loading.

The catalyst may be used in the form of a washcoat coated onto a substrate, such as a metal or ceramic flow-through monolith substrate or a filtering substrate. The monolith substrate may have a honeycomb geometry, which comprises a plurality of adjacent, parallel channels that have a square cross-sectional area. The honeycomb shape of a monolith substrate provides a large catalytic surface having a minimal overall size and pressure drop. A specific example of such a substrate includes, without limitation, a wall-flow filter. Accordingly, another aspect of the disclosure is a washcoat that comprises a catalyst component as described herein. In addition, the catalyst washcoat may further comprise a binder material, such as alumina, silica, (non-zeolite) silica-alumina, naturally occurring clays, $TiO_2$, $ZrO_2$, and $SnO_2$.

According to another aspect of the present disclosure a process for reducing NOx emissions in a gas stream comprises contacting the emissions with a substrate upon which the catalyst has been deposited. This catalyst being a metal-containing AFX zeolite formed according to the teachings of the present disclosure. When desirable, the gas stream may be contacted with the exhaust article in the presence of ammonia, thereby providing a selective catalytic reduction (SCR) system.

The following specific examples are given to illustrate the disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure.

In the following examples, a HORIBA LA-920 laser particle sizer is used for the measurement of particle size distribution, a Rigaku MiniFlex II DESKTOP X-ray diffractometer is used for the measurement of phase and crystallinity, a Micromeritics TriStar II 3020 is used for the measurement of BET surface areas, a Spectra Analytical Instruments Model FCPSA83D ICP is used for analysis of chemical compositions, and zeolite morphology is measured using scanning electron microscopy (SEM).

Example 1

Preparation & Characterization of a Batch of AFX Zeolites

A predetermined amount of Y zeolite having a silica to alumina ratio (SAR) of 30:1 was added to water to form a clear solution. The amount of Y Then predetermined amounts of potassium hydroxide (i.e., source of metal cations) and N, N'-bis-triethylpentanediyldiammonium hydroxide (i.e., structure directional agent, RNOH) were added into the solution. The solution was mixed together to form a transparent sol or gel composition of $60SiO_2:Al_2O_3:12RNOH:12.4Na_2O:1332H_2O$. The gel composition was transferred to an autoclave and heated to 165° C. for 48 hours. The AFX zeolite, which formed and precipitated, was filtered away from the mother liquid, washed with water, and dried at 120° C. The collected AFX zeolite was stored for further analysis. The collected AFX zeolite was found to exhibit an SAR value of 13.82.

Figure 4:
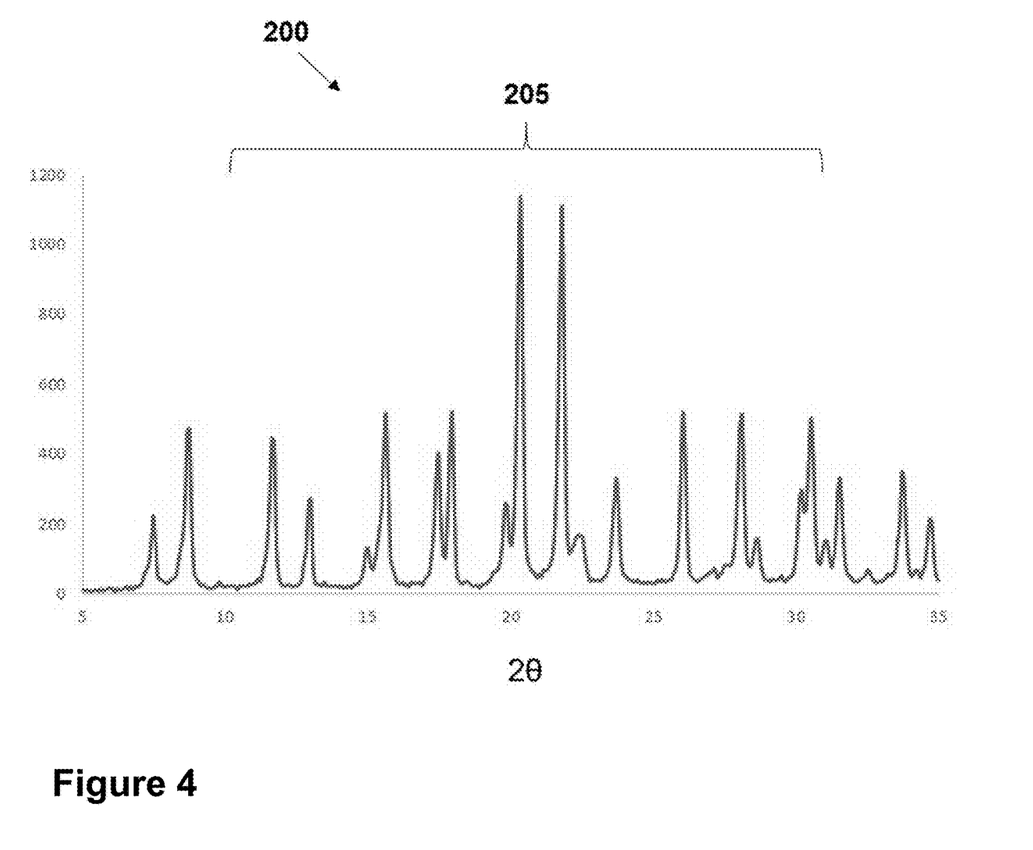
FIG. 4 is an x-ray diffraction (XRD) spectrum of the AFX zeolite formed according to the teachings of the present disclosure.

Referring now to FIG. 4 the measured x-ray diffraction (XRD) pattern 200 for the AFX zeolite collected and dried in this example shows 2 theta peaks 205 that correspond to an AFX structure or framework. The measured XRD pattern 200 further demonstrates that this AFX zeolite is substantially free of any other type of crystalline zeolite phase or structure. Methods commonly used to form conventional AFX zeolites yield mixed phase products. In other words, conventional synthetic methods normally form zeolites that exhibit two or more framework types, which are less desirable than pure phase Zeolites for use in catalytic reactions.

Figure 5:
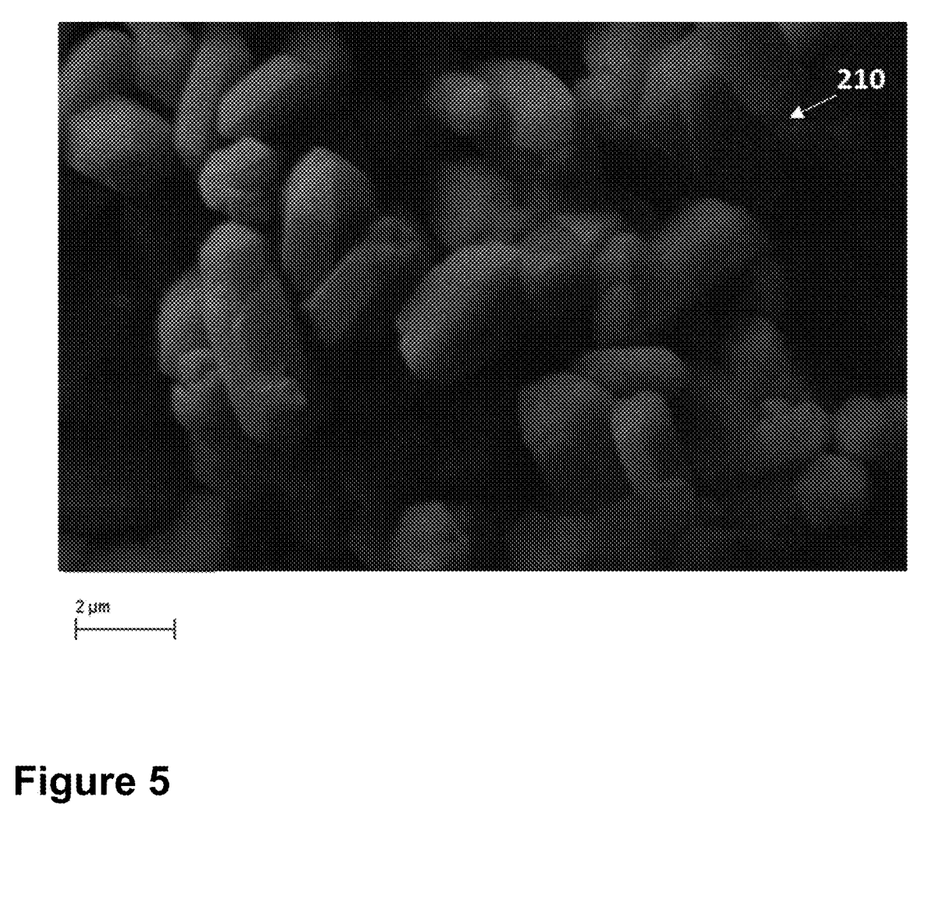
FIG. 5 is a scanning electron micrograph (SEM) of the AFX zeolite described in FIG. 4.

Referring now to FIG. 5, the morphology of the AFX zeolite collected and dried in this Example is shown in the scanning electron micrograph to include predominantly AFX structures 210. The AFX structures 210 are shown to have an average crystal size of about 2 micrometers. The AFX structures 210 represent a mixture of spheroidal, cubic, and rhombic particles.

Example 2

Preparation & Characterization of Another Batch of AFX Zeolites

A predetermined amount of Y zeolite having a silica to alumina ratio (SAR) of 10:1 was added to water to form a clear solution. The amount of Y Then predetermined amounts of potassium hydroxide (i.e., source of metal cations) and N, N'-bis-triethylpentanediyldiammonium hydroxide (i.e., structure directional agent, RNOH) were added into the solution. The solution was mixed together to form a transparent sol or gel composition of $29.7SiO_2:Al_2O_3:2.9RNOH:11.9Na_2O:843H_2O$. The gel composition was transferred to an autoclave and heated to 165° C. for 48 hours. The AFX zeolite, which formed and precipitated, was filtered away from the mother liquid, washed with water, and dried at 120° C. The collected AFX zeolite was stored for further analysis. The collected AFX zeolite was found to exhibit an SAR value of 8.5.

Example 3

Measurement of NOx Conversion

A catalyst was formed by substituting a portion of the metal cations in the AFX zeolite of Example 1 with copper metal. The catalyst in both a "fresh" condition and after being hydrothermally aged at a temperature of 700° C. for a period of 16 hours was tested for facilitation of $NO_x$ conversion reactions. The rate of $NO_x$ conversion associated with the metal-containing catalyst was measured utilizing a Micromeritics 2920 acting as a micro flow reactor and a MKS Residual Gas analyzer, which performs the analysis of gas concentrations after passing through the sample. The samples are typically tested with the following gas concentrations: NO=175 ppm; $NO_2$=175 ppm; $NH_3$=350 ppm; and $O_2$=175 ppm. The samples are tested under $50,000^{-1}$/hr space velocity. The $NO_x$ conversion is measured at each individual temperature under steady state reactions, the sample is first heated to the target temperature and the $NO_x$ conversion is then measured once steady state is observed. Typically, the $NO_x$ conversion numbers are calculated from a steady state condition after 45 minutes of consistent pressure through the MKS Residual Gas analyzer.

Figure 6:
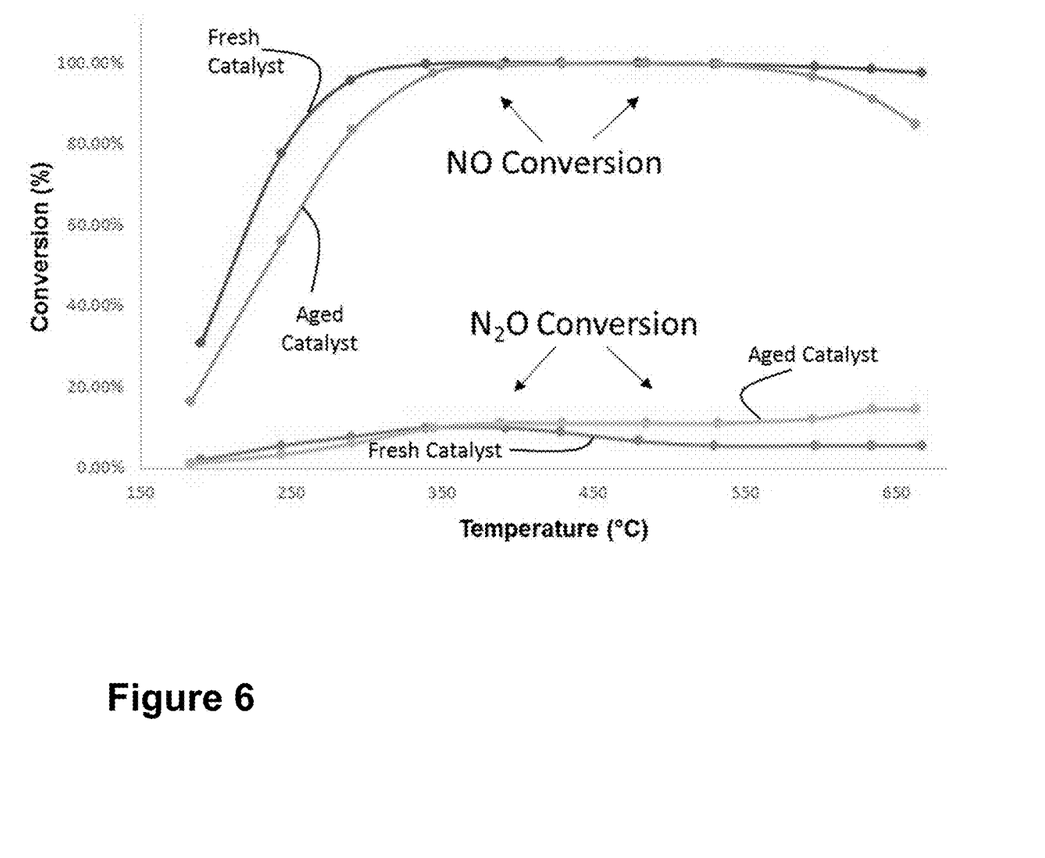
FIG. 6 is a chart of NOx conversion percentage plotted as a function of temperature for a catalyst prepared according to the teachings of the present disclosure.

Referring now to FIG. 6, the fresh metal-containing catalyst formed by substituting a portion of the metal cations in the AFX zeolite with copper metal results in about 100% conversion of NO over a wide temperature of about 300° C. to about 650° C. The conversion over the same temperature range for $N_2O$ for the same fresh catalyst is about 5% to about 10%. After aging the catalyst still exhibits NO conversion of 100% over a temperature range of about 350° C. to about 550° C., while the conversion for $N_2O$ is enhanced to about 10% over the same temperature range.

For the purpose of this disclosure, the terms "about" and "substantially" are used herein with respect to measurable values and ranges due to expected variations known to those skilled in the art (e.g., limitations and variability in measurements).

For the purpose of this disclosure any range in parameters that is stated herein as being "between [a $1^{st}$ number] and [a $2^{nd}$ number]" or "between [a $1^{st}$ number] to [a $2^{nd}$ number]" is intended to be inclusive of the recited numbers. In other words the ranges are meant to be interpreted similarly as to a range that is specified as being "from [a $1^{st}$ number] to [a $2^{nd}$ number]".

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one metal", "one or more metals", and "metal(s)" may be used interchangeably and are intended to have the same meaning.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of making an AFX zeolite, the method comprising the steps of:
   a) providing a source of silica;
   b) providing a source of alumina;
   c) providing a structure directional agent (SDA); wherein the amount of the SDA is characterized by the molar ratio, $OH:SiO_2$, of base, OH—, to silica, $SiO_2$;
   d) providing a source of metal cations;
   e) mixing the source of silica and alumina with the SDA and the source of metal cations in water to form a gel composition;

f) providing an additional source of a base, OH— to the gel composition;

g) heating the gel composition to a crystallization temperature that is less than 225° C.;

h) maintaining the gel composition at the crystallization temperature for a time period that ranges from 24 hours to 48 hours;

i) allowing the AFX zeolite to crystallize and precipitate; the gel composition forming a crystalline precipitate of the AFX zeolite and a mother liquid; and j) separating the crystalline precipitate from the mother liquid;

wherein the, $OH:SiO_2$, molar ratio ranges from 0.7:1 to 0.9:1;

wherein the formed AFX zeolite exhibits a silica to alumina, $SiO_2:Al_2O_3$, molar ratio (SAR) that is between 8:1 and 26:1;

wherein the formed AFX zeolite has a morphology that includes one or more of cubic, spheroidal, or rhombic particles;

wherein the formed AFX zeolite exhibits a crystal size that is in the range of about 0.1 micrometer (μm) to 10 μm.

2. The method of claim 1, wherein the AFX zeolite exhibits a silica to alumina ($SiO_2:Al_2O_3$) molar ratio (SAR) that is in the range of 8:1 to 13:1.

3. The method of claim 1, wherein the source of silica is selected from the group consisting of sodium silicate, silica sol, colloidal silica, fumed silica, tetraethyl orthosilicate, Y zeolites, and a combination of any two or more therefore.

4. The method of claim 1, wherein the source of alumina is selected from the group consisting of aluminum metal, aluminum hydroxide, aluminum sulfate, aluminum nitrate, sodium aluminate, aluminum chloride, aluminosilicate gel, Y zeolites, and a combination of any two or more therefore.

5. The method of claim 1, wherein the source of silica and the source of alumina is from Y zeolites that have a silica to alumina ratio (SAR) of between 10:1 and about 30:1.

6. The method of claim 1, wherein the amount of the structure directing agent (SDA) and the silica ($SiO_2$) source provided is defined by a $SDA:SiO_2$ molar ratio that ranges from 0.05 to 0.30.

7. The method of claim 1, wherein the amount of the water ($H_2O$) and the silica ($SiO_2$) source provided is defined by a $H_2O:SiO_2$ molar ratio that ranges from 20:1 to 80:1.

8. The method of claim 1, wherein the structure directional agent (SDA) comprises a N, N'-bis-triethylpentanediyldiammonium cation.

9. The method of claim 1, wherein the source of metal cations is selected to be an alkali metal, an alkaline earth metal, or a combination thereof.

10. The method of claim 1, wherein the formed AFX zeolite exhibits a Brönsted acidity that is in the range of 1.2 mmol/g to 3.6 mmol/g as measured by ammonia temperature programmed desorption.

11. The method of claim 1, wherein the gel composition is heated to a crystallization temperature that is in the range of about 130° C. to about 165° C.

12. A method of forming a catalyst for use in low temperature conversion of NOx emissions, wherein the method comprises the steps of:

forming an AFX zeolite according to the method of claim 1 containing one or more metal cations as part of the AFX zeolite;

providing a source of at least one transition metal; and subjecting the AFX zeolite and the source of the transition metal to an ion exchange, impregnation, or isomorphous substitution process;

wherein the at least one transition metal is substituted for the metal cations in the AFX zeolite, thereby forming the catalyst.

13. The method according to claim 12, wherein the amount of the transition metal (TM) and aluminum present in the catalyst is further defined by a TM:Al molar ratio in the range of 0.3 to 1.0.

14. The method according to claim 12 wherein the transition metal is selected from the group of iron (Fe), copper (Cu), manganese (Mn), or a combination thereof.

15. The method according to claim 12, wherein the $NO_x$ emissions comprise NO and $N_2O$ emissions;

wherein the catalyst is configured for 100% conversion of the NO emissions over the temperature range of 300° C. to 650° C.

16. The method according to claim 15, wherein the catalyst is configured for between 5% to about 10% conversion of $N_2O$ emissions over a temperature range of 300° C. to 650° C.

\* \* \* \* \*